Oct. 15, 1940.  R. W. SPRINGER  2,218,183
DOOR LOCKING MECHANISM
Filed Feb. 14, 1938  2 Sheets-Sheet 2
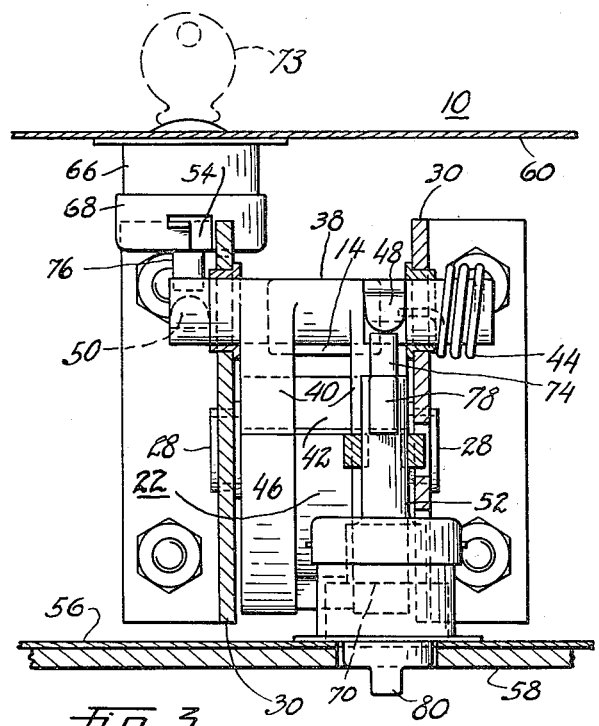
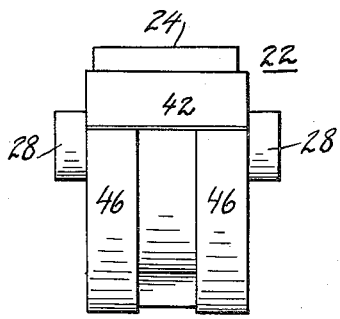
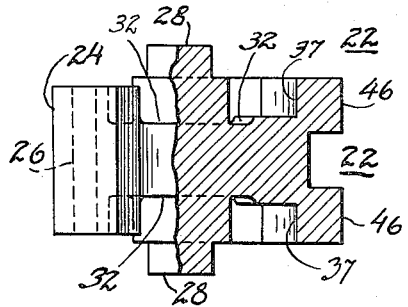
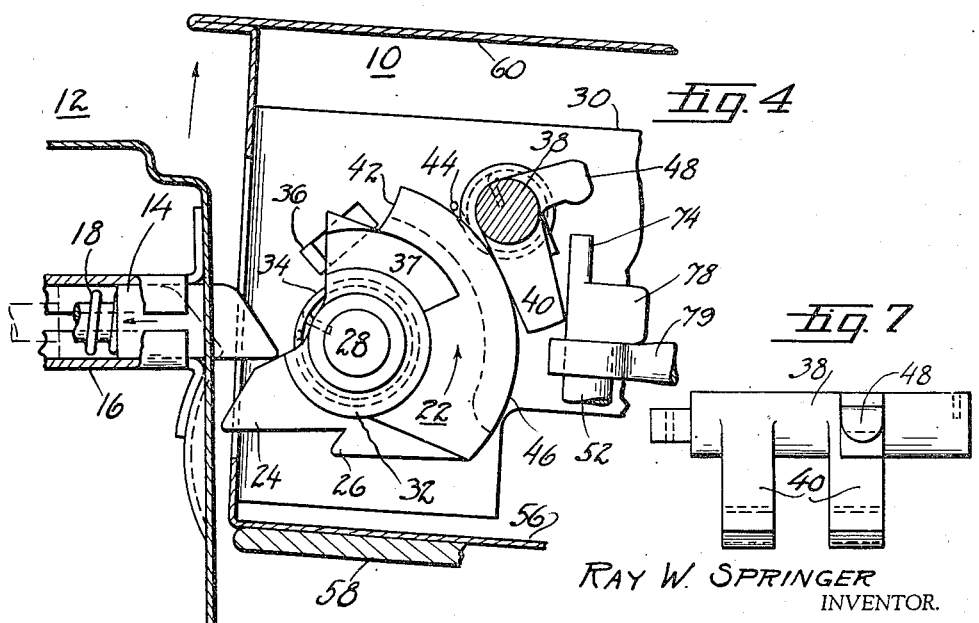
RAY W. SPRINGER
INVENTOR.
BY Parker & Burton
ATTORNEYS.

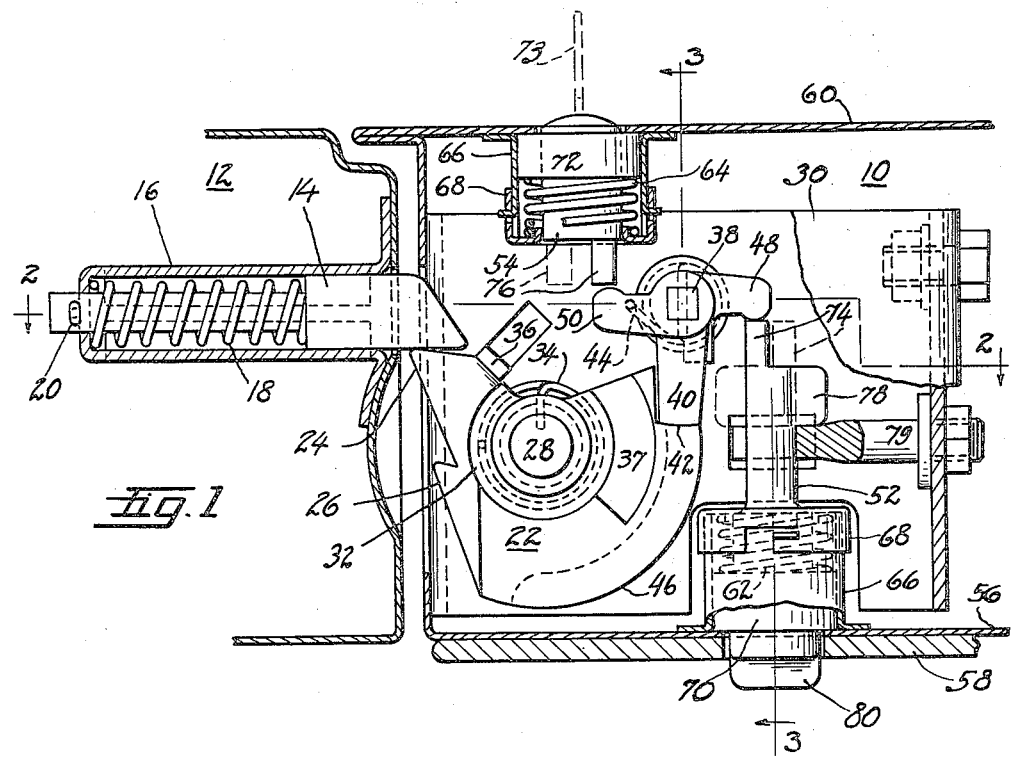

Patented Oct. 15, 1940

2,218,183

UNITED STATES PATENT OFFICE 2,218,183

DOOR LOCKING MECHANISM

Ray W. Springer, Detroit, Mich.

Application February 14, 1938, Serial No. 190,436

17 Claims. (Cl. 70—149)

This invention relates to an improved door latching and locking mechanism particularly adapted for use in automobiles and similar types of vehicles.

An important object of this invention is to provide an improved door latching mechanism particularly adapted for vehicles wherein all exposed projecting controls may be eliminated, thus stream lining the appearance of the body in which the mechanism is located as well as increasing the safety of the passengers in the vehicle. When the door locking device of this invention are installed on motor vehicles to control the doors thereof, all of the devices are constructed in a novel manner so that they may be locked from the inside of the vehicle against intrusion from the outside of the vehicle. When thus locked, the outside control member for each device is movable to the same extent as when the device is in unlocked condition but is ineffective to unlock the doors. The ability of the outside control member to yield to manual forces when the device is locked prevents breakage of parts when illegal attempts are made to force an entrance into the locked vehicle. The occupants of the vehicle may, if they desire, lock themselves in against undesired intrusion. One of the locking devices is capable of being locked by a key from the outside but is so constructed that when locked the outside control member is movable in response to attempts to open the door but is ineffective to accomplish this end.

Door locking devices embodying the principle of this invention are simple and rugged in construction and economical to manufacture. They are constructed for ease in operation and for continuous hard usage under all conditions.

More particularly the invention comprehends a door locking device wherein a novel movable or rotary locking element is locked or released from locked condition by one or more control members operable from the opposite sides of the body in which the device is mounted. These operating members control the locking element through a novel detent device which is capable of locking the element in projecting condition and thus lock the door. These members are mounted for both rotational and longitudinal reciprocal movement and are capable upon bodily reciprocal movement in one position of their rotation to release the locking element from engagement by the detent and in another position of their rotational movement to simply reciprocate lengthwise without effecting the detent. These operator controlled members may extend in opposite directions through opposite side walls of the body in which the device is located and be responsive to manual pressure from either side of the body.

When the locking device is employed to lock a door or a vehicle, novel means may be associated with the operating member which extends to the inside of the vehicle to positively lock the device against entrance from the outside. This is accomplished by the inexpensive novel expedient of shaping the inside operated control member so that when it is turned to its ineffective position in its rotational movement the member positively obstructs the release movement of the detent associated with the locking element. An occupant in the vehicle may therefore operate the devices from the inside of the vehicle in order to prevent accidental opening of the door or in order to lock himself in against undesired intrusion.

It is desirable in motor vehicle construction upon which this invention is used to provide one door from which exit is last made. Thus before leaving the vehicle all the other doors may be locked from the inside as described previously. The last exit door is provided with a lock mechanism similar to those in the other doors but having an additional novel key controlled means for locking the outside control member against rotation but allowing the same to reciprocate in the same manner as when it is in unlocked state. A key control such as that customarily employed for locking the doors of the motor vehicle may be employed. The reciprocation of the control member, however, is ineffective to operate the door lock mechanism unless the proper key has been inserted and the control member turned. The provision of reciprocal control members both in this door lock and in the locking devices of the other doors enables door lock controls to be made which, as illustrated in the drawings herein may be substantially flush with the outer and inner surfaces of the vehicle body. This improves the appearance of the vehicle and increases the safety factor of the occupants in the vehicle.

The invention comprehends a novel construction for the striker plate which renders it economical to manufacture and enables it to operate evenly and with minimum amount of wear. Associated with the striker plate is a novel rocker shaft carrying a pair of spaced detents which are adapted to engage the striker plate opposite to and in substantial alignment with the trunnions about which the striker plate rotates so that the strains and stresses incurred in latching the door and preventing unauthorized forcible entrance are taken through parts of maximum strength and ruggedness.

Various other objects, advantages and meritorious features will become more apparent from the following description, appended claims and accompanying drawings wherein:

Figure 1 is a top cross-sectional view of the door latching mechanism associated with a door of a vehicle, Fig. 2 is a cross-sectional view of the latching mechanism along line 2—2 of Fig. 1, Fig. 3 is a cross-sectional view along line 3—3 of Fig. 1, Fig. 4 is a top cross-sectional view of the door latching mechanism showing the operating position of the mechanism as the door is opened, Fig. 5 is a rear end view of the rotary striker plate, Fig. 6 is a side view of the striker plate partially broken away to show its interior construction, Fig. 7 is a view of the rocker shaft showing the detents provided therein for interlocking engagement with the striker plate.

The drawings illustrate the manner of assembling the door locking mechanism in the body of an automobile. It is expressly understood however that the invention is capable of use with other door structures. In the drawings, reference numeral 10 refers generally to a door of a vehicle which is swingable to a closed position against the door jamb or post generally indicated at 12. Figs. 1 and 2 show the door in closed position. Fig. 4 illustrates the condition of the mechanism when the door has just commenced to open. The striker plate mechanism in the drawings is carried in the door body while the bolt which cooperates with the striker plate to latch the door in closed position is positioned in the body of the pillar post. It is obvious, however, that these conditions can be reversed and that the striker plate mechanism may be located in the pillar post and the cooperating locking or latching bolt in the door body.

In the embodiment of the invention illustrated herein both the latching bolt and the striker plate element are retractible into their respective bodies. As shown, the latching bolt 14 is reciprocal in a housing 16 carried within the pillar post 12. The bolt is yieldingly projected from the edge of the pillar post by a coiled spring 18. A stop element 20 on the rear end of the bolt limits the forward travel of the bolt.

The striker plate mechanism in the door body 10 comprises the cooperating latching element or striker plate 22 having a catch part 24 which projects into overlapping relationship with the bolt 14 to latch the door in closed position as shown in Fig. 1. An auxiliary or safety latching element 26 is provided on the striker plate to engage the bolt and hold the door slightly ajar in the event that it is accidentally opened. The latching element, or striker plate 22 as it is commonly termed, is retractible inside the body of the door when it is desired to open the door. The striker plate is formed of a single piece of cast metal and is provided as shown in Figs. 5 and 6 with oppositely projecting trunnions 28—28 for journaling the striker plate in the opposite sides of the housing 30 in which the striker plate mechanism is disposed. Circular recesses 32—32 (Fig. 6) are formed in the sides of the striker plate around each trunnion 28. Seated in each of these recesses is a coiled spring 34 connected at one end of the striker plate and the other end to the fixed sides of the housing 30. These coiled springs yieldingly urge the striker plate to rotate clockwise in Fig. 1 until the part 24 abuts the stops 36. In this position the striker plate will latch the door in closed position by engagement with the latch bolt 14. The stops 36 may be formed as shown in Fig. 2 by striking out projections in the opposite side walls of the housing.

The springs 34 are easily overcome by manual forces opening the doors. When the striker plate 22 is rotated in counterclockwise direction it is capable of being rotated beyond the position illustrated in Fig. 4 until the latching part 24 is retracted within the housing of the device. To prevent the stops 36 from interfering with the retractible rotational movement of the striker plate, the spring seating recesses of the latter are widened as at 37 for a short distance. The widened section of the recesses permit the striker plate to ride past the stops 36 in its counterclockwise direction of rotation.

Likewise rotatably supported by the spaced side walls of the housing 30 is a rocker shaft 38 extending substantially parallel to the axis of rotation of the striker plate and carrying novel means engageable with the striker plate to lock the same in projected condition. This means comprises a pair of spaced detents 40—40 integral with the shaft as shown in Fig. 7 and having their ends spaced to enter a recess 42 extending transversely across the rear end of the striker plate as shown in Figs. 1, 3 and 5. The relation of the shaft to the striker plate is such that the detents 40 are capable of entering the recess 42 only when the striker plate is in its projected position illustrated in Fig. 1. Encircling one end of the shaft as shown in Figs. 2 and 3 is a coiled spring 44 which yieldingly acts to rotate the shaft in the direction to swing the detents against the striker plate. Projecting arcuate flanges 46—46 are provided on the inner side of the striker plate 22 in the plane of the detents to provide bearing surfaces upon which the ends of the detents may slide when the striker plate is released for rotation. The provision of spaced detents distributes the forces incurred during the opening and closing movements of the doors and equalizes the pressures on the trunnions 28 so they will operate evenly.

In order to operate the striker plate latching mechanism from either or both sides of the body in which it is located, novel operating elements are employed which in certain positions of their movement are responsive to manual forces to release the striker plate and in other positions are likewise responsive to manual forces but act ineffectively upon the mechanism. Carried upon the rocker shaft 38 are a pair of arms 48 and 50 extending laterally from opposite sides of the axis about which the shaft works. One of these arms, such as 48, is formed integrally with the shaft at an intermediate point therealong. The other arm 50 is detachably secured to one end of the shaft outside the housing 30 in order to facilitate assembly. Operatively engageable with each of the arms is a member or plunger which extends through a side of the door body for actuation from the outside. The plunger associated with the arm 48 is indicated at 52; the rod associated with the arm 50 is indicated at 54. As shown in Fig. 1 these rods extend in directions opposite to one another and through the side walls of the door body. Rod 52 projects through the inside metal panel 56 and the trim fabric 58 of the doors. The outer end of rod 54 projects through the outside metal panel 60 of the door.

Each member or rod 52 and 54 is resiliently urged outwardly away from the arms on the rocker shaft. Coiled spring 62 yieldingly projects the outer end of rod 52 through the inside panel of the door body. Coiled spring 64 similarly projects the rod 54 through the outside panel of the door. These springs are each carried in a two-piece housing secured to the inside side of the door panel and surrounding the rod with which the spring is associated. The spring housings are similarly constructed and comprise a cylindrical element 66 secured to the inside surface of the door panel and a cover element 68 clinched to the inner end of the cylinder element. The rods 52 and 54 are provided with annular shoulders 70 and 72 respectively which slide in the cylindrical elements 66 and guide the rods in their reciprocal movement.

Each rod 52 and 54 is rotatably mounted as well as lengthwise movable in the cylinder elements 66 of the spring housings. The inner ends of each rod are constructed in an important novel way for engagement with their cooperating arm on shaft 38 when the rod is in a certain position of its rotational movement. Upon lengthwise bodily movement of the rod in this position, the end of the rod will engage the arm with which it is associated and rock the shaft in a direction to disengage the detents from the striker plate. The inner ends of each rod are so shaped, however, that upon partial rotation thereof the ends of the rods will upon reciprocation escape past the arm and fail to work the shaft. In the embodiment of the invention illustrated herein, this method of operating or failing to operate the release functions of the rocker shaft is accomplished by offsetting a projecting part on the rods so that in the effective position of the rods the part is in alignment with the arm to engage and swing the same upon lengthwise movement. In its ineffective position the projecting part of the rod is out of alignment with the arm so that upon lengthwise movement of the rod the projecting parts escape past the arm. Rod 52 is provided with the projecting part 74 forming an integral part thereof but arranged off-center from the axis of rotation. Rod 54 is provided with a similarly shaped part 76 operating in the same way. The full line positions of these parts in Fig. 1 show the rods in effective rotational position. The dotted lines of these parts in this figure show the rod in their ineffective positions.

Novel means is provided which is responsive to the ineffective rotational position assumed by one of the rods for positively preventing disengagement of the detents 40 from the striker plate. This rod is preferably rod 52 which is operated from inside of the vehicle. As a result of this construction it is possible to lock all the doors of a vehicle from the inside. When it is desired to leave the vehicle unoccupied all the doors except one may be locked in this manner. This last door may be locked from the outside by key controlled mechanism described hereinafter. The occupant may, if he so desires, lock himself in by this means to prevent possible intrusion from the outside. This is accomplished in a simple and inexpensive manner by the provision of a laterally projecting ridge 78 formed integrally on the rod 52 and adapted in its non-effective position to lie directly behind one of the detents 40 as shown in the dotted outline in Fig. 1. In this position it is obvious that the detents cannot be disengaged from the recess in the striker plate, thus the latter is positively locked in projected latching condition. The outer end of rod 52 is provided with a handle 80 which not only facilitates rotation but also indicates by its position whether the rod is in locked or operating position.

To properly support the longer rod 52 in its longitudinal movement, a member 79 is provided which is fixed at one end to the housing of the device and is provided at its other end with a jaw adapted to embrace the shank of the rod 52 adjacent the ridge 78 but loosely so that the rod may slide therethrough.

The mechanism thus far described may be provided on all the doors of the vehicle. It is the usual practice to provide means for locking one of the doors from the outside thus making it possible to leave the vehicle safely unoccupied by locking all the doors from the inside except this one and locking this one from the outside. In the present invention, rod 54 which projects through the outside panel of the door has a cylindrical hollow interior in which a key operated locking device is fitted. The key operated device is of the usual type employed on the doors of motor vehicles including a lock barrel and pin tumblers which lock the barrel to the inside wall structure of the rod 54. Upon insertion of the proper key in the lock barrel the tumblers are shifted so that the barrel can be turned. The rod 54 in which this lock barrel is fitted may be held against rotation in any suitable way such as by flattening one or opposite sides of the rod and slidably mounting the rod in a fixed structure which bears against these flattened portions. In this door, the projecting part 76 forms an integral part of the lock barrel as distinguished from the rod proper but when the rod is reciprocated the lock barrel and projection 76 is carried therewith. In the other or interior door locking devices, as previously stated, the projection 74 forms an integral part of the rod 52. It is understood that in either case the projection 74 or 76 is reciprocable with the rod, the only difference being that in the key operated door lock the projection forms a part of the lock barrel and turns therewith in the rod 54 when the proper key is used. The holding portion of a key is indicated at 73 in dotted outline in Fig. 1.

The operation of the mechanism is clearly apparent from the previous description. To recapitulate, when it is desired to lock the door from the inside of the vehicle, the handle of rod 52 is grasped and turned to its ineffective position. In such a position, the rod, although retractible in response to manual pressure, does not function to rock the shaft 38 and release the striker plate. The door is therefore locked against accidental opening and if unintentional pressure should be exerted upon the rod it will merely yield to the pressure without opening the door. As explained previously, the ridge 78 carried by the rod 52 automatically functions to prevent release movement of the detents 40 thus positively preventing one from opening the door from the outside by pushing upon the outer extremity of rod 54.

To open the door from the inside, rod 52 is rotated to its effective position and upon exerting pressure upon the handle 80 the detents 40 will be disengaged from the striker plate. In this position the coiled springs 34 encircling the trunnions of the striker plate are the only instruments acting to retain the striker plate in latched condition. Without releasing the rod 52 and upon exerting pressure upon the door to open it, the striker plate will yield to the presence of the bolt 14 and rotate backwardly against the tension of the springs 34 at the same time the door commences to open. The striker plate will rotate inwardly far enough so that it will escape past the bolt 14 in the manner indicated in Fig. 4.

To completely lock a vehicle upon which these door locks are installed, all the doors with the exception of the door containing the key control mechanism (which is usually the right front door) are locked by turning their respective rod 52 to the position at which the abutment 78 will lie closely behind the locking dog 40. The last door containing the key operated lock is then closed and locked from the outside by inserting the proper key in the lock barrel and turning the barrel until the projection 76 in this device is turned to its ineffective position as indicated in dotted outline in Fig. 1.

Each door is preferably under-cut on its outside portion to form a handle which may be grasped by the fingers to open the door when the lock devices are in unlocked condition. An under-cut may be found in the molding of the window of each door to serve as a handle. This will eliminate the use of a projecting handle on each door and improve the outside appearance of the vehicle body.

What I claim:

1. Door latching and locking mechanism comprising, in combination, a rotary latching element having a part adapted to project from one side of the body in which it is mounted, spring means yieldingly urging said element to rotate in a direction to project said part, a rotatably mounted shaft for controlling the latching element having means carried thereby adapted in one position of the shaft's rotation to releasably engage the element in its projected position and lock the same against retractible movement, said shaft also carrying a pair of arms projecting from opposite sides thereof, a push button for each arm mounted for rotation and lengthwise bodily movement, each push button element having a part axially offset the axis of the element and adapted in one position of rotation of the element and upon lengthwise movement thereof to engage the arm with which it is associated and rotate said shaft to release said locking means from engagement with the latching element, said axially offset part of the push button element adapted in another position of rotation of the element and upon lengthwise movement thereof to ineffectively pass by the arm and thus fail to release the latching element for retractible movement.

2. Door latching and locking mechanism comprising, in combination, a rotatably mounted striker plate having a part adapted to project from one side of the body in which the mechanism is located and having a recess adapted to engage a locking detent, spring means yieldingly urging said plate to rotate in a direction to project said part thereof, a control shaft for said striker plate rotatably mounted on an axis parallel to that of the striker plate, said shaft carrying a detent engageable in the recess in said striker plate to lock the plate in projected position, spring means yieldingly urging said shaft to rotate in a direction to swing said detent into engagement with said recess, said shaft also carrying a pair of operating arms extending from opposite sides thereof, a rotatable and longitudinally reciprocal operating rod associated with each arm and extending vertically to the axis of said shaft and from opposite sides thereof so that the remote ends of each rod project beyond the body in which the mechanism is located, spring means yieldingly urging said rods outward away from engagement with said arms, the inner end of each rod being axially offset whereby at one position of rotation of the rod such offset end is in line to actuate its arm upon longitudinal movement of the rod and at the opposite position of rotation of the rod such end is offset the arm and ineffective to actuate it upon longitudinal movement of the rod.

3. Door latching and locking mechanism comprising, in combination, a body having a rotary striker plate adapted in certain positions to project from the body, a control shaft for said striker plate rotatably mounted on an axis parallel to that of the striker plate, said control shaft carrying a detent releasably engageable with said striker plate to lock the latter in projected position, an arm projecting from said shaft, a rotatable and longitudinally movable rod extending at right angles to the axis of said shaft, said rod having an axially offset part adapted in one position of rotation of the rod to engage said arm upon longitudinal movement of the rod to rotate the control shaft and adapted in another position of rotation of the rod to ineffectively escape past said arm when the rod is moved lengthwise.

4. Door latching and locking mechanism comprising, in combination, a rotatable striker plate adapted in one position of rotation to project for latching engagement, a control shaft for said striker plate rotatably mounted on an axis parallel to that of the striker plate, said control shaft carrying a detent releasably engageable with said striker plate to lock the latter in projected latching position, an arm projecting from said shaft, a rotatable endwise movable rod extending at right angles to the axis of said shaft, said rod having an axially offset end portion adapted upon rotation of the rod to a determined position to engage said arm to rotate the control shaft upon endwise movement of the rod, said offset end portion adapted at another position of rotation of the rod to ineffectively pass by said arm upon endwise movement of the rod, and means on said rod adapted to engage said detent when the rod is rotated to its ineffective position whereby the striker plate is positively locked in projected position until the rod is rotated to effective position.

5. Lock mechanism comprising, in combination, a rotatable striker plate having a latch bolt engaging catch part, spring means yieldingly rotatably urging said plate to project its catch part to engage a latch bolt, rotatable locking means having a detent and provided with a spring yieldingly rotatably urging said means to project its detent into engagement with the striker plate to prevent rotation of the striker plate counter the spring pressure acting on the plate, said locking means having two arms, two push button elements each supported for endwise movement and for rotation, each push button element having an offcenter inner end portion adapted at one position of rotation of the element to be aligned with one arm of the locking means and upon endwise movement of the element to rotate said locking means to release its detent from engagement with the striker plate, said offcenter inner end portion of each push button element adapted in another position of rotation of the element to be out of line with its arm and to permit endwise movement of the element without engaging said arm.

6. Lock mechanism comprising, in combination, a rotatable striker plate having a latch bolt engaging catch part, spring means yieldingly rotatably urging said plate to project its catch part to engage a latch bolt, rotatable locking means having a detent and provided with a spring yieldingly rotatably urging said means to project its detent into engagement with the striker plate to prevent rotation of the striker plate counter the spring pressure acting on the striker plate, said locking means having two arms, two push button elements each supported for endwise movement and for rotation, each push button element having an offcenter inner end portion adapted at one position of rotation of the element to be aligned with one arm of the locking means and upon endwise movement of the element to rotate said locking means to release its detent from engagement with the striker plate, said off-center inner end portion of each push button element adapted in another position of rotation of the element to be out of line with its arm and to permit endwise movement of the element without engaging said arm, one push button element provided with a projecting part adapted in said last mentioned position of rotation of the element to engage a part of said locking means and prevent rotation thereof in a direction to release the detent from the striker plate.

7. Lock mechanism comprising, in combination, a casing, a striker plate having opposed supporting shaft ends journalled within the casing, said plate having two circumferentially spaced latch bolt catches and a detent receiving recess, springs engaging the opposed ends of the shaft rotatably urging the same to project the latch bolt catches beyond the casing, a stop adapted to limit the spring urged rotation of said plate, a rotatably supported lock shaft provided with a detent adapted to engage the recess of the striker plate to prevent rotation of the striker plate to disengage its latch bolt, a spring rotatably urging said lock shaft toward engagement of the detent upon the striker plate recess, said lock shaft having two opposed arms, a manually operable rotatably endwise movable plunger associated with each arm, each plunger provided with an arm engaging part adapted at one position of rotation of the plunger to be aligned with the arm to engage it upon endwise movement of the plunger and adapted in another position of rotation of the plunger to be out of alignment with the arm so as not to engage it upon endwise movement of the plunger.

8. Lock mechanism comprising, in combination, a rotatable striker plate having a latch bolt engaging catch part and provided with a spring acting rotatably thereon to project said catch part, a rotatable lock shaft having a detent and provided with a spring acting rotatably on the shaft to project the detent against said striker plate to prevent rotation of the plate in the direction of withdrawal of its catch part, said lock shaft having a radially projecting lever arm, a rotatable plunger movable endwise in at least two positions of rotation and effective at one of said positions of rotation to act upon said arm to rotate the lock shaft upon endwise movement but ineffective at the other position of rotation upon such endwise movement.

9. Door latching and locking mechanism comprising, in combination, a rotatably mounted striker plate having a part adapted to project from one side of the body in which the mechanism is located and having a recess adapted to engage a locking detent, spring means yieldingly urging said plate to rotate in a direction to project said part, a control shaft for said striker plate rotatably mounted on an axis parallel to that of the striker plate, said shaft carrying a detent engageable in the recess in said striker plate to lock the plate in projected position, spring means yieldingly urging said shaft to rotate in a direction to swing said detent into engagement with said recess, said shaft also carrying a pair of operating arms extending from opposite sides thereof, a rotatable and longitudinally shiftable operating rod associated with each arm and extending vertically to the axis of said shaft and from opposite sides, the remote end of each rod projecting through the wall of the body in which the mechanism is located, spring means yieldingly urging each rod away from the arm operated by the rod, the inner end of each rod being axially offset whereby at one position of rotation of the rod such offset end is in line to actuate its arm upon longitudinal movement of the rod and at the opposite position of rotation of the rod such end is offset the arm and ineffective to actuate it upon longitudinal movement of the rod, one of said operating rods having means adjacent its inner end adapted when the rod is rotated to non-operating position to be disposed against the side of said detent to positively lock the same against movement from the recess in the striker plate by movement of the other rod into its effective position.

10. In lock mechanism having a latch bolt, a rotatable striker plate having a latch bolt engaging catch, a stop positioned to engage the striker plate when the bolt catch is engaged with the latch bolt, a spring acting to normally hold the plate against said stop, a locking element rockable into engagement with the striker plate to hold it against said stop, two individually operable plungers, each plunger being rotatable and axially shiftable and adapted in one position of rotation and upon axially shiftable movement to actuate said locking element to release the striker plate but ineffective in another position of rotation and upon axially shiftable movement to so actuate said locking element.

11. Lock mechanism comprising, in combination, a rotatable striker plate having a latch bolt engaging catch adapted to be projected upon rotation of the plate to a given position, a stop positioned to engage the striker plate when the bolt catch is so projected, a spring acting to normally hold the plate against said stop, a locking element rockable into engagement with the striker plate to hold it against said stop, a rotatable and axially shiftable plunger having a part adapted at one position of rotation of the plunger to hold said locking element in engagement with the striker plate, said plunger being effective at another position of rotation and upon axially shiftable movement to actuate the locking element to release the striker plate for rotation.

12. Lock mechanism comprising, in combination, a latch bolt, a rotatable striker plate having a latch bolt engaging catch, a spring acting rotatably upon the striker plate to urge its catch to a projected position, a locking element rockable into engagement with the striker plate to hold the catch at said projected position, two individually operable plungers, each plunger being rotatably and axially shiftable and adapted in one position of rotation and upon axially shiftable movement to actuate said locking element to release the striker plate but ineffective in another position of rotation and upon axially shiftable movement to so actuate said locking element, and spring means acting upon each plunger to yieldingly hold it against actuating said locking element.

13. Lock mechanism comprising, in combination, a rotatable striker plate having a latch bolt engaging catch, a spring acting rotatably upon the striker plate to urge its catch to an operative position, a locking element rockable into engagement with the striker plate to hold the catch at said operative position, a hollow axially shiftable plunger, a lock barrel within the plunger shiftable axially therewith but rotatable relative thereto, said lock barrel having a part adapted in one position of rotation and upon axially shiftable movement of the plunger and barrel to actuate said locking element to release the striker plate but ineffective in another position of rotation and upon axially shiftable movement of the plunger and barrel to so actuate said locking element.

14. Lock mechanism comprising, in combination, a rotatable striker plate having a latch bolt engaging catch and having an arcuate circumferential portion terminating in a detent, spring means acting rotatably upon the striker plate to hold its catch in operative position to engage the latch bolt, a locking element spring urged against said circumferential portion of the striker plate adapted to ride thereover upon rotation of the plate and adapted to engage the detent of the plate when the plate catch is held in said operative position, a rotatable axially shiftable plunger adapted in one position of rotation and upon axially shiftable movement to rock said locking element counter its spring out of the detent in the striker plate to release the plate, said plunger being ineffective in another position of rotation and upon axial movement to rock said locking element.

15. Lock mechanism comprising, in combination, a rotatable striker plate having a latch bolt engaging catch, a spring acting rotatably upon the striker plate to yieldingly hold the catch projected to operative position, a rotatable lock shaft provided with a part adapted to engage the striker plate to prevent rotation of the plate counter the spring acting thereupon, two individually operable plungers, each plunger being rotatable and axially shiftable and adapted in one position of its rotation and upon axially shiftable movement to act upon said lock shaft to rotate it to release said striker plate but ineffective in another position of its rotation and upon axial movement to so rotate said lock shaft, said lock shaft being provided adjacent one end with a part adapted to be acted upon by one plunger to rotate the shaft and provided spaced therefrom and adjacent to its opposite end with a second part adapted to be acted upon by the other plunger to rotate the shaft.

16. Lock mechanism comprising, in combination, a casing formed of complementary angular plates, a striker plate supported upon a shaft journalled at opposite ends in said plates, said striker plate having a latch bolt engaging catch, a spring acting upon the plate to rotate it to bring its catch into operative position, a lock shaft journalled at opposite ends in said plates and having a part adapted to engage said striker plate to prevent rotation thereof counter the striker plate spring, a spring acting upon said lock shaft to hold said part against said striker plate, a rotatable and axially shiftable plunger supported to extend through one casing plate for axially shiftable movement and for rotation, a rotatable and axially shiftable plunger supported to extend through the other casing plate for axially shiftable and rotatable movement, each plunger having a part adapted to engage the lock shaft to rotate the shaft to disengage the striker plate when the plunger is positioned at one point of rotation and is actuated axially, said plunger being capable of axial actuation at another position of rotation without engaging said lock shaft to rotate the same.

17. Lock mechanism comprising, in combination, a rotatable striker plate having a latch bolt engaging part adapted in one position of rotation of the plate to be projected to engage the latch bolt and in another position of rotation of the plate to be withdrawn from such engagement, a rotatable lock bolt adapted in one position of rotation to lock the striker plate against withdrawal of said part and in another position of rotation to permit said withdrawal, two plungers each axially shiftable to rotate the bolt to release the striker plate for withdrawal of the latch bolt engaging part, one plunger being rotatable and adapted in one position of rotation to secure the lock bolt against releasable rotation by the other plunger and adapted in another position of rotation to permit actuation of the lock bolt by the other plunger.

RAY W. SPRINGER.